United States Patent
Byun

(10) Patent No.: US 8,232,001 B2
(45) Date of Patent: Jul. 31, 2012

(54) BATTERY PACK

(75) Inventor: Bohyun Byun, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 904 days.

(21) Appl. No.: 12/250,825

(22) Filed: Oct. 14, 2008

(65) Prior Publication Data

US 2009/0123834 A1 May 14, 2009

(30) Foreign Application Priority Data

Nov. 12, 2007 (KR) ........................ 10-2007-0114930

(51) Int. Cl.
*H01M 2/04* (2006.01)
*H01M 2/06* (2006.01)
*H01M 10/02* (2006.01)

(52) U.S. Cl. ......... 429/163; 429/175; 429/178; 429/181

(58) Field of Classification Search .................. 429/163, 429/175–176, 178–179, 181
See application file for complete search history.

(56) References Cited

U.S. PATENT DOCUMENTS

| | | | |
|---|---|---|---|
| 2004/0241541 A1* | 12/2004 | Watanabe et al. | 429/163 |
| 2004/0251872 A1* | 12/2004 | Wang et al. | 320/112 |
| 2005/0112415 A1 | 5/2005 | Takeshita et al. | |
| 2005/0208346 A1* | 9/2005 | Moon et al. | 429/7 |
| 2006/0099492 A1* | 5/2006 | Jeon | 429/61 |
| 2006/0210870 A1* | 9/2006 | Moon et al. | 429/175 |
| 2009/0130554 A1* | 5/2009 | Jang et al. | 429/179 |
| 2011/0070465 A1* | 3/2011 | Kim | 429/7 |

FOREIGN PATENT DOCUMENTS

| | | |
|---|---|---|
| EP | 1 630 889 A1 | 3/2006 |
| EP | 1 926 160 A1 | 5/2008 |
| JP | 2005135770 A * | 5/2005 |
| JP | 2005-142153 A | 6/2005 |
| JP | 2006-004783 | 1/2006 |
| JP | 2006-004783 A | 1/2006 |
| KR | 2006-0057055 A | 5/2006 |
| KR | 10-0604276 B1 | 7/2006 |
| KR | 10-0624966 | 9/2006 |
| KR | 10-0682731 | 2/2007 |
| KR | 100791551 * | 1/2008 |
| KR | 10-0821858 | 4/2008 |
| WO | WO 2006/068383 A1 | 6/2006 |

OTHER PUBLICATIONS

Machine translation of JP 2005-135770 (May 2005).*
Machine translation of JP 2006-004783 (Jan. 2006).*
English-language Abstract of KR 10-2005-0081175.
English-language Abstract of KR 10-2007-0075938.

* cited by examiner

*Primary Examiner* — Basia Ridley
*Assistant Examiner* — Jacob Buchanan
(74) *Attorney, Agent, or Firm* — Knobbe Martens Olson & Bear, LLP

(57) ABSTRACT

A battery pack including: a bare cell including an electrode assembly, and a can to house the electrode assembly; and a protective circuit board including a base plate, disposed on the can. The can includes a cap plate disposed in an opening thereof, including a first terminal that extends toward the protective circuit board. The protective circuit board includes a base plate, a first connection terminal connected to the first terminal, a second connection terminal connected to the cap plate, and a first opening corresponding to the first and second connection terminals.

17 Claims, 8 Drawing Sheets

BATTERY PACK

CROSS-REFERENCE TO RELATED APPLICATION

This application claims the benefit of Korean Application No. 2007-114930, filed Nov. 12, 2007, in the Korean Intellectual Property Office, the disclosure of which is incorporated herein by reference.

BACKGROUND OF THE INVENTION

1. Field of the Invention

Aspects of the present invention relate to a battery, and more particularly, to a battery pack that can increase a length of a bare cell, relative to the length of the battery pack, and can be produced by a simplified manufacturing process.

2. Description of the Related Art

Lithium secondary battery have an operating voltage of 3.6V, which is three times the operating voltage of a nickel-cadmium battery or a nickel-hydrogen battery, which are commonly used power sources for portable electronic devices. In addition, lithium secondary batteries have higher energy densities per unit weight. Accordingly, lithium secondary batteries have been widely used in portable wireless devices, and in other technological fields.

Generally, a lithium secondary battery is manufactured as a battery pack. The battery pack usually includes a bare cell, a protective circuit board, and a molding part or case that covers the protective circuit board.

The bare cell includes a rechargeable electrode assembly, a can having an upper opening to receive the electrode assembly, and a cap assembly to seal the upper opening of the can. The bare cell includes a negative terminal that is electrically coupled to a negative electrode of the electrode assembly, and to a cap plate of the cap assembly.

The protective circuit board is electrically coupled to the negative terminal of the bare cell, and to the cap plate. The protective circuit board is connected to the cap plate, by a lead plate vertically combined to the cap plate. In addition, the protective circuit board is connected to the negative terminal, by another lead plate vertically extended from the negative terminal. A separate connection lead is extended downward from the protective circuit board, and welded to the lead plate.

The molding part or case is formed to surround the protective circuit board, at the upper part of the bare cell, thereby protecting the protective circuit board. However, the length of the battery pack is increased, because the bare cell and protective circuit board are connected by the separate conductive member, such as the vertically extended lead plate and the connection lead. In other words, the connection lead of the protective circuit board and the lead plate increase the length of the battery pack, and thereby reduce the capacity per total volume of the battery.

The connection lead and lead plate are combined in the following process. First, the protective circuit board and bare cell are fixed by a separate jig, so that the connection lead and lead plate contact each other. The protective circuit board is arranged perpendicular to the upper surface of the bare cell. Then the connection lead and lead plate are welded. The protective circuit board is arranged in parallel with the upper surface of the bare cell, by bending the lead plate. Thus, the bare cell and protective circuit board are combined through a complicated process.

SUMMARY OF THE INVENTION

An aspect of the present invention provides a battery pack having improved capacity, due to having a bare cell that has an increased height, relatively to the entire length of the battery pack.

Another aspect of the present invention is to provide a battery pack that can be produced with lower manufacturing costs, according to a simplified manufacturing process.

According to an aspect of the present invention, there is provided a battery pack, which comprises: a bare cell including a can to house an electrode assembly, a cap plate combined to an upper part of the can, and including a first terminal extending from an upper part of the cap plate; and a protective circuit board including a base plate, a first connection terminal connected to the first terminal, a second connection terminal connected to the cap plate, and a first opening formed in a region corresponding to the first and second connection terminals. The can includes an upper opening, main and side walls, and a lower plate.

According to aspects of the present invention, the battery pack may further include a case connected to the upper part of the bare cell, to receive the protective circuit board. The case includes a upper plate, a side wall, and a second opening formed in a region of the upper plate, corresponding to the first opening. A lower part of the case is open.

According to aspects of the present invention, the first and second connection terminals may be L-shape. The first and second connection terminals extend downward from opposing edges of the first opening, and are bent to extend toward each other.

According to aspects of the present invention, the first connection terminal may be L-shaped, and includes a first vertical plate extended downward from the base plate, and a first horizontal plate extended horizontally from the first vertical plate. The second connection terminal may be L-shaped, and includes a second vertical plate extended downward from the base plate, and a second horizontal plate extended toward the first connection terminal, from the first vertical plate.

According to aspects of the present invention, the first vertical plate may be shorter than the second vertical plate.

According to aspects of the present invention, the cap plate may include combining grooves formed at both sides thereof, and the protective circuit board may include combining openings formed at positions corresponding to the combining grooves. The case may be formed in a shape of bar that is extended downward from the upper plate, at a position corresponding to the combining groove. The case may further include combining projections that extend through the combining openings, and are inserted into to the combining groove.

According to aspects of the present invention, the case may further include a plurality of holding projections that are formed on an inner surface of the side wall, and are spaced by a distance corresponding to a thickness of the protective circuit board, downward from a lower surface of the upper plate. The holding projections may be angled with respect to the side wall.

According to aspects of the present invention, the case may include a first pressing part that extends downward from the edge of the second opening, to contact the first connection terminal, and a second pressing part to contact the second connection terminal.

According to aspects of the present invention, the first and second pressing parts may be formed in a wall body that is extended along the edge of the second opening hole.

According to aspects of the present invention, the first pressing part may be shorter than the second pressing part.

According to aspects of the present invention, the case may further include a support part formed between the first and second pressing parts.

According to aspects of the present invention, the case may further include a cover to seal the second opening.

According to aspects of the present invention, the support part may include a connection hole that is vertically formed.

According to aspects of the present invention, the cover may further include a connection pin that is formed in a shape of bar, extending from the lower surface of the cover, and combined to the connection hole.

According to aspects of the present invention, the battery pack may further include an adhesive sheet and a lower cover. The adhesive sheet surrounds the bare cell, and a portion of the side wall of the case. The lower cover is formed in a plate shape, corresponding to the lower plate of the bare cell, and is combined to the lower surface of the bare cell.

According to aspects of the present invention, the adhesive sheet may further include a sheet sleeve that is extended from a region corresponding to the main wall of the bare cell, and attached to the other opposing main wall.

According to aspects of the present invention, the lower cover may further include a sheet groove to receive the sheet sleeve.

According to aspects of the present invention, the sheet sleeve may be attached to the sheet groove to surround the lower cover. In addition, the sheet sleeve may be attached to the main wall of the bare cell.

According to aspects of the present invention, the sheet sleeve may be formed in a thickness corresponding to a depth of the sheet groove.

According to another aspect of the present invention, there is provided a battery pack, which comprises: a bare cell including a can receiving an electrode assembly, a cap plate combined to an upper part of the can and a first terminal withdrawn out of an upper part of the cap plate. The can includes an upper opening, main and side walls, and a lower plate. The battery pack further includes: a protective circuit board including a first connection terminal connected to the first terminal, a second connection terminal connected to the cap plate, and a first opening formed in a region corresponding to the first and second connection terminals; and an insulation member interposed between the bare cell and protective circuit board.

Additional aspects and/or advantages of the invention will be set forth in part in the description which follows, and in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which.

DETAILED DESCRIPTION OF THE EMBODIMENTS

Figure 1:
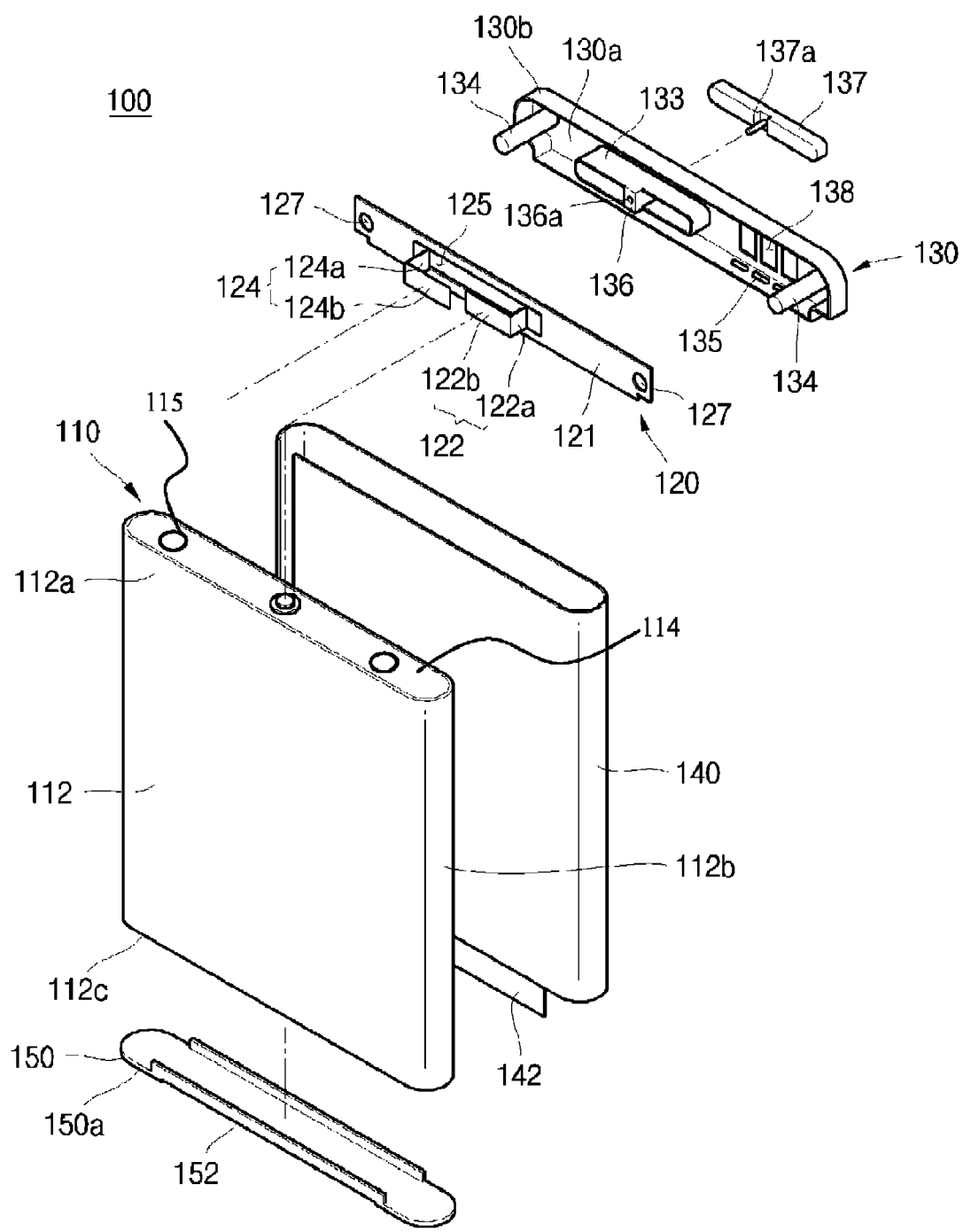
FIG. 1 is an exploded perspective view illustrating a battery pack, according to one exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

Figure 2:
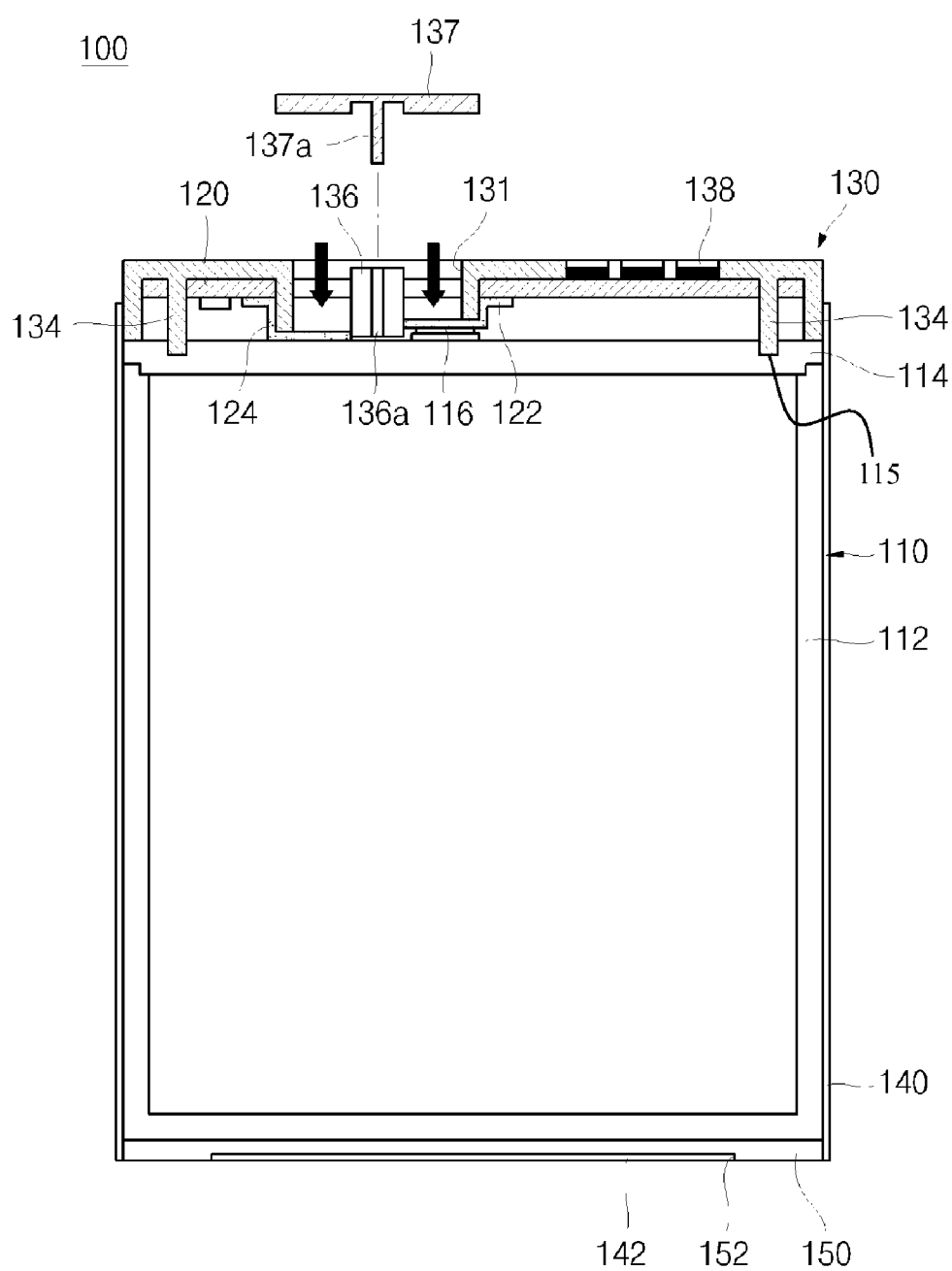
FIG. 2 is a vertical sectional view illustrating the battery pack, according to the embodiment of FIG. 1.
Figure 3:
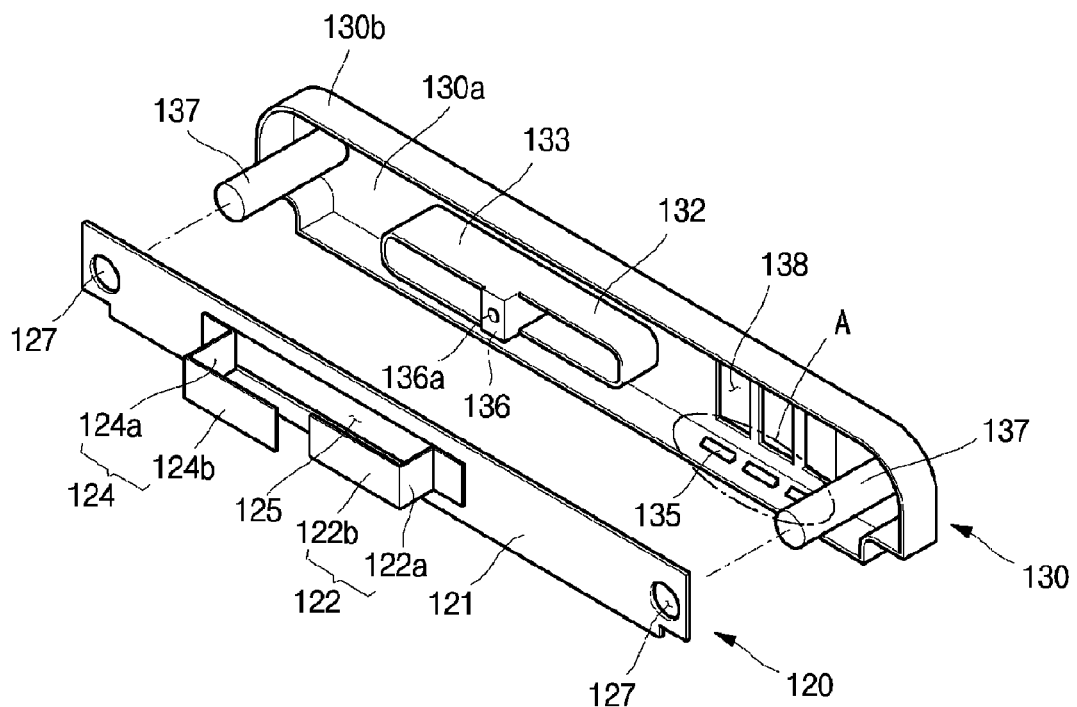
FIG. 3 is a perspective view illustrating a substrate case and a protective circuit board, according to the embodiment of FIG. 1.
Figure 4:
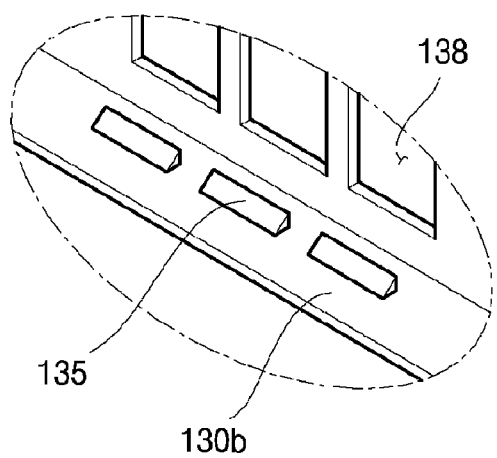
FIG. 4 is a magnified perspective view illustrating part A of FIG. 3.
Figure 5:
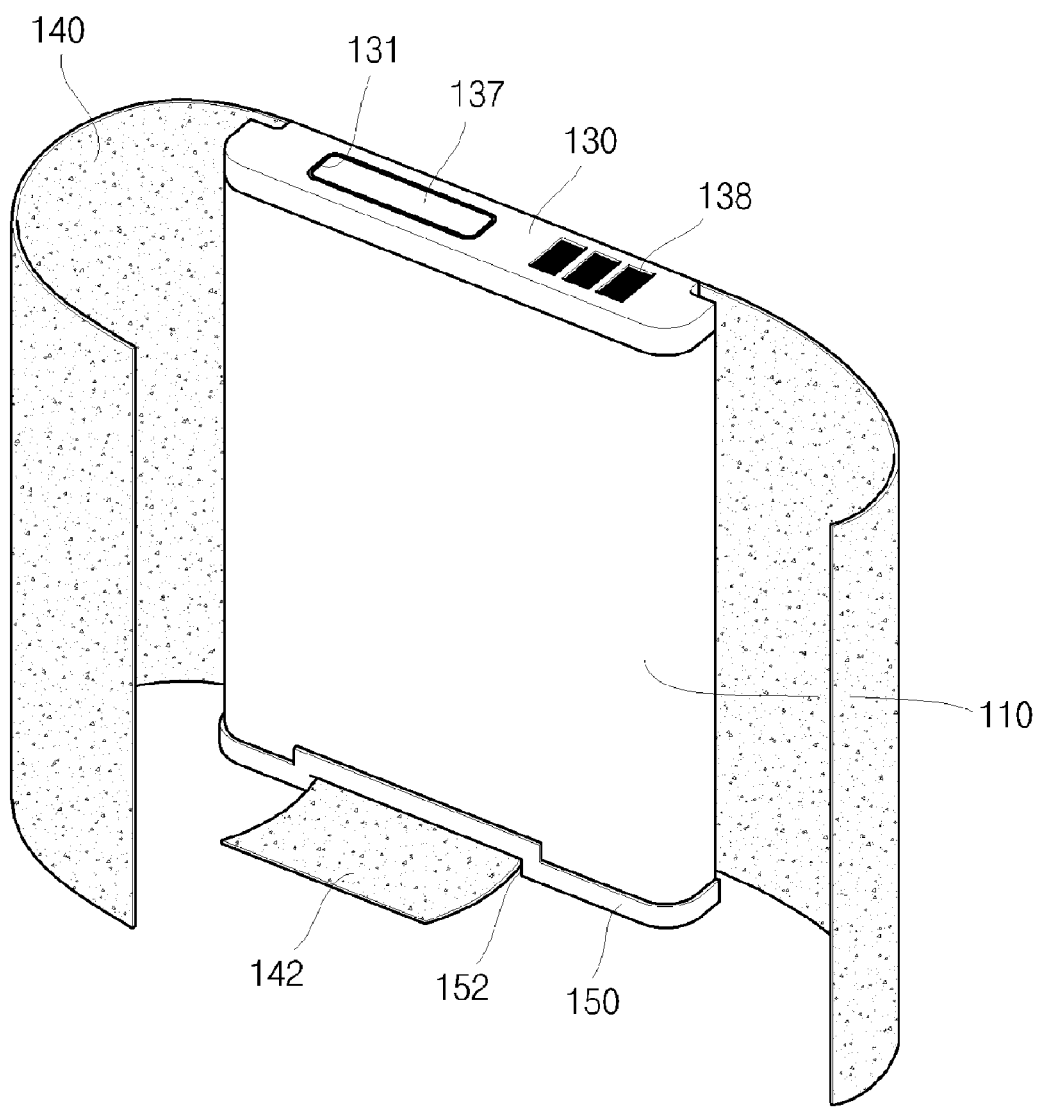
FIG. 5 is a perspective view illustrating a process of attaching an adhesive sheet of the battery pack, according to the embodiment of FIG. 1.
Figure 6:
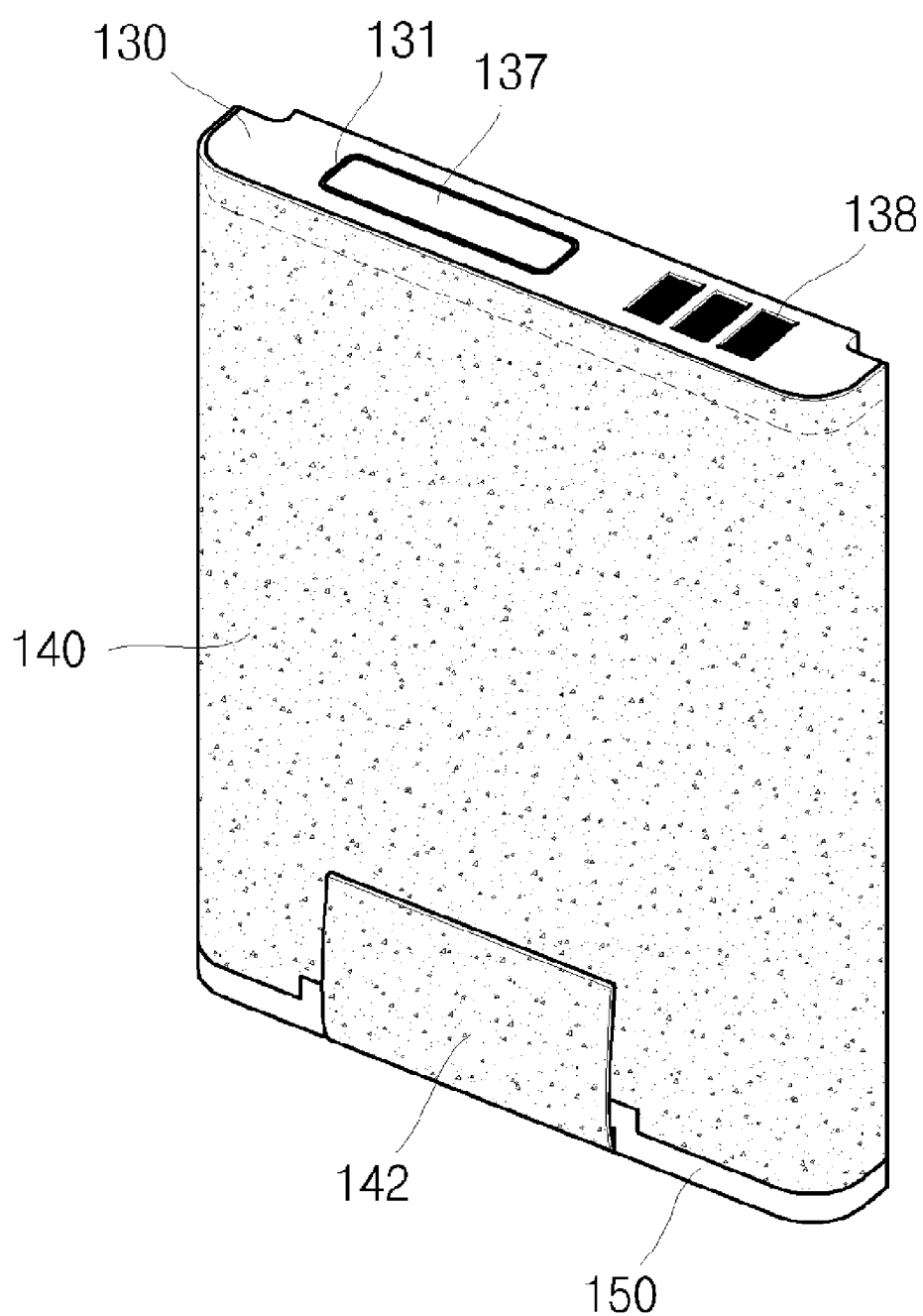
FIG. 6 is a perspective view illustrating the adhesive sheet attached to the battery pack.

FIG. 1 is an exploded perspective view illustrating a battery pack 100, according to one exemplary embodiment of the present invention, and FIG. 2 is a vertical sectional view illustrating the battery pack 100. FIG. 3 is a perspective view illustrating a case 130 and a protective circuit board 120, according to the embodiment of FIG. 1, FIG. 4 is a magnified perspective view illustrating part A of FIG. 3, and FIG. 5 is a perspective view illustrating a process of attaching an adhesive sheet 140 to the battery pack 100. FIG. 6 is a perspective view illustrating the adhesive sheet 140, when attached to the battery pack 100.

Referring to FIGS. 1 to 6, the battery pack 100 includes a bare cell 110, the protective circuit board 120, and the case 130. In addition, the battery pack 100 may further include the adhesive sheet 140 and a lower cover 150.

In the battery pack 100, the bare cell 110, and the protective circuit board 120 are electrically coupled to each other. Therefore, the length of a contact area between the bare cell 110 and that protective circuit board 120 is decreased. Accordingly, the length of the bare cell is increased, relative to the length of the battery pack 100. Thus, the battery capacity can be increased, relative to the size of the battery pack 100.

The bare cell 110 includes a can 112, a cap plate 114, and a first terminal 116. The bare cell 110 may be a bare cell used in a conventional lithium secondary battery, and a detailed description of the construction thereof, is omitted.

An upper part of the can 112 is open. The can 112 is generally rectangular, and includes opposing main walls 112a, opposing side walls 112b, and a lower plate 112c. The main wall 112a is a relatively wider wall, and the sidewall 112b is a relatively narrower wall. The lower plate 112c faces the upper opening, and contacts the main and side walls 112a and 112b. An electrode assembly (not shown) is received in the can 112, through the upper opening. The can 112 may be any can generally used in conventional lithium secondary batteries.

The cap plate 114 includes combining grooves 115 formed at opposing sides thereof. The cap plate 114 is combined to the upper part of the can 112, to seal the upper part of the can 112. The cap plate 114 forms a cap assembly, together with a terminal plate (not shown), and an insulation plate (not shown). The cap plate 114 is electrically coupled to a second electrode of the electrode assembly, and can be referred to as a second terminal.

The combining grooves 115 are formed on the upper surface of the cap plate 114. Combining projections 134 of the case 130 are inserted into the combining grooves 115. Accordingly, the combining grooves 115 have a diameter that is larger than that of the combining projections 134.

The first terminal 116 extends from the upper part of the cap plate 114, and is insulated from the cap plate 114. The first terminal 116 is electrically coupled to the electrode assembly.

The first terminal 116 can be an anode terminal, and the cap plate 114 can be a cathode terminal. Alternatively, the first terminal 116 can be a cathode terminal, and the cap plate 114 can be an anode terminal.

The protective circuit board 120 includes a base plate, first and second connection terminals 122 and 124, and a first opening 125. In addition, the protective circuit board 120 further includes combining openings 127, formed at both sides of the base plate 121.

The protective circuit board 120 is spaced from the cap plate 114, by the first and second connection terminals 122 and 124, and is electrically coupled to the bare cell 110. The protective circuit board 120 includes a protection circuit to protect the bare cell 110 from over-charging/over-discharging.

The protective circuit board 120 is spaced from the cap plate 114, by the first and second connection terminals 122 and 124. Thus, electronic devices mounted on the base plate 121 are prevented from contacting the cap plate 114.

The base plate 121 can be a PCB (Printed Circuit Board) including a conductive pattern. Electronic devices, such as a chip, and/or a resistor, are mounted on the base plate 121.

The first connection terminal 122 includes a first vertical plate 122a that extends downward from the base plate 121, and a first horizontal plate 122b that extends toward the second connection terminal 124, from the first vertical plate 122a. The first connection terminal 122 is generally L-shaped. The first horizontal plate 122b directly contacts, and is electrically coupled to, the first terminal 116 of the bare cell 110. The first connection terminal 122 is combined to the first terminal 116, by welding or a conductive adhesive. The welding is usually performed by a spot welding method, which is a kind of resistance welding. When the first connection terminal 122 is combined to the first terminal 116, by the conductive adhesive, an adhesive layer may be interposed between the first connection terminal 122 and first terminal 116.

The second connection terminal 124 includes a second vertical plate 124a that extends downward from the base plate 121, and a second horizontal plate 124b that extends toward the first connection terminal 122, from the second vertical plate 124a. The second connection terminal 124 is generally L-shaped. The second horizontal plate 124b is spaced from the first horizontal plate 122b, so as to electrically insulate the second connection terminal 124 from the first connection terminal 122.

The second connection terminal 124 contacts the cap plate 114, and the first connection terminal 122 contacts the first terminal 116. The first terminal 116 projects from the upper surface of the cap plate 114. The second vertical plate 124a is relatively longer than the first vertical plate 122a. In other words, the second connection terminal 124 extends downward further than the first connection terminal 122. The second connection terminal 124 directly contacts, and electrically coupled to, the cap plate 114. The second connection terminal 124 is combined with the cap plate 114, by welding or a conductive adhesive.

The first opening 125 is a through-hole extending through the base plate 121. The first opening 125 is formed in a region corresponding to the first and second connection terminals 122 and 124. The first and second connection terminals 122 and 124 are exposed above the base plate 121, through the first opening 125. Particularly, upper surfaces of the first horizontal plate 122b, and the second horizontal plate 124b, are exposed. The first and second connection terminals 122 and 124 extend downward from opposing sides of the first opening 125. In other words, the first and second connection terminals 122 and 124 extend downward from opposing edges of the first opening 125.

The first opening 125 provides a path for welding the first and second connection terminals 122 and 124, to the first terminal 116 and cap plate 114. The first opening 125 provides a path to press the first and second connection terminals 122 and 124, to the first terminal 116 and cap plate 114, respectively.

The combining openings 127 are through-holes formed in the base plate 121. The combining openings 127 face the combining grooves 115 of the cap plate 114. The combining projections 134 of the case 130 pass through the combining openings 127. Accordingly, the combining openings 127 have diameters larger than that of the combining projections 134.

The lower part of the case 130 is open, and the case 130 includes an upper plate 130a and a side wall 130b. In addition, the case 130 includes a second opening 131, a first pressing part 132, a second pressing part 133, combining projections 134, and holding projections 135. The case 130 may further include a support part 136 and a cover 137. The case 130 may further include terminal holes 138.

The case 130 houses the protective circuit board 120, in a space formed by the upper plate 130a and side wall 130b. The open lower part is combined to the upper part of the bare cell 110. The case 130 protects the upper surface of the cap plate 114 and the protective circuit board 120, by preventing them from being exposed to the outside. The case 130 may be formed of molded resin that is manufactured by injection molding.

The upper plate 130a is shaped to correspond to the cap plate 114. The upper plate 130a may extend outside of the cap plate 114, according to design of the battery pack 100. The side wall 130b extends downward from an outer edge of the upper plate 130a.

The second opening 131 is formed in a region of the upper plate 130a that faces the first opening 125 of the protective circuit board 120. The second opening 131 exposes the first and second connection terminals 122 and 124 to the upper part of the case 130. The first and second connection terminals 122 and 124 are directly welded to the first terminal 116 and cap plate 114, respectively, by a welding device inserted through the second opening 131.

The first pressing part 132 extends downward from the edge of the second opening 131, toward the first connection terminal 122. The first pressing part 132 extends from the edge of the second opening 131, to contact the first horizontal plate 122b of the first connection terminal 122. The first pressing part 132 presses the first horizontal plate 122b, to maintain the contact between the first connection terminal 122 and the first terminal 116.

The second pressing part 133 extends downward from the edge of the second opening 131, to the second connection terminal 124. The second pressing part 133 is similar to the first pressing part 132. The first pressing part 132 has a height corresponding to the height of the first vertical plate 122a. The second pressing part 133 has a height that corresponds to the height of the second vertical plate 124a, which is greater than the height of the first pressing part 132.

The second pressing part 133 extends from the edge of the second opening 131, to contact the second horizontal plate 124b. The second pressing part 133 presses against the second horizontal plate 124b, to maintain the contact between the second connection terminal 124 and the second terminal.

The combining projections 134 are generally bar-shaped, and extend downward from both sides of the upper plate 130a. The combining projections 134 correspond to the combining grooves 115 of the cap plate 114. The combining projections 134 pass through the combining openings 127, and are inserted into the combining grooves 115. Thus, the combining projections 134 fix the case 130 to the upper part of the bare cell 110.

The holding projections 135 are formed on the inner surface of the side wall 130b, and are spaced from the lower surface of the upper plate 130a of the case 130, by a distance corresponding to the thickness of the protective circuit board 120. The holding projections 135 extend from the inner surface of the side wall 130b of the case 130. The height of the holding projections 135 gradually decrease in the downward direction. The lower ends of the holding projections 135 are formed on the same plane as the side wall 130b. In other words, the side surfaces of the holding projections 135 are inclined with respect to the side wall 130b, and are triangular.

The holding projections 135 fix the protective circuit board 120 to the lower surface of the upper plate 130a. In other words, the protective circuit board 120 is inserted and fixed between the upper plate 130a and the holding projections 135. More particularly, when the protective circuit board 120 is inserted into the case 130, the side surface of the protective circuit board 120 moves along the inclined surfaces of the holding projections 135. The side wall 130b having the holding projection 135 is deformed outward. When the protective circuit board 120 passes by the holding projections 135, the widened side wall 130b of the case 130 is then restored by its own elasticity. Thus, the protective circuit board 120 is supported by the holding projections 135, and is combined to the lower surface of the upper plate 130a.

The support part 136 is block-shaped, and includes a connection hole 136a. The support part 136 is formed between, and supports, the first and second pressing parts 132 and 133.

The connection hole 136a is a through-hole that is formed in the support part 136. A connection pin 137a of a cover 137 is inserted in, and is fixed to, the connection hole 136a.

The cover 137 is plate-shaped, and corresponds to the shape of the second opening 131. The cover 137 includes the connection pin 137a. The cover 137 is combined to the upper part of the second opening 131, to seal the second opening 131. The cover 137 is adhered to the second opening 131, by an adhesive.

The connection pin 137a is bar-shaped, and extends downward from the lower surface of the cover 137. The connection pin 137a is inserted into the connection hole 136a of the support part 136, to fix the cover 137 to the case 130. The connection pin 137a may be coated with an adhesive, and inserted into the connection hole 136a. Thus, the cover 137 is more strongly fixed to the case 130, by the connection pin 137a.

The terminal holes 138 are defined in the upper plate 130a of the case 130. The terminal holes 138 correspond to terminals of the protective circuit board 120. The terminal holes 138 expose the outer terminals to the outside of the case 130.

Thus, the outer terminals can be electrically coupled to a terminal of an external device, through the terminal hole 138.

The adhesive sheet 140 surrounds the main and side walls 112a and 112b of the bare cell 110. The adhesive sheet 140 surrounds a portion of the side wall 130b of the case 130. The adhesive sheet 140 further includes a sheet sleeve 142. The adhesive sheet 140 protects the bare cell 110, and allows the bare cell 110 to be more strongly combined with the case 130. The adhesive sheet 140 may be a label having an adhesive side and a printed side that is printed with characters.

The sheet sleeve 142 extends downward from one main wall 112a of the bare cell 110. The sheet sleeve 142 extends around the lower cover 150, to the other main wall 112a. Thus, the sheet sleeve 142 allows the bare cell 110 to be more strongly combined with the lower cover 150.

The lower cover 150 is plate-shaped, and corresponds to the lower plate 112c of the bare cell 110. The lower cover 150 includes a groove 152, formed on a lower surface 150a thereof. The lower cover 150 is combined to the lower plate 112c of the bare cell 110, to insulate the lower plate 112c. The lower cover 150 protects the lower plate 112c of the bare cell 110.

The groove 152 is formed on the lower surface of the lower cover 150, and extends from one main wall 112a of the bare cell 110 to the other main wall. The sheet sleeve 142 is inserted and attached to the groove 152. Accordingly, the lower surface 150a of the lower cover 150 is kept flat, even if the sheet sleeve 142 is attached thereto. In addition, the groove 152 has a depth that corresponds to the thickness of the sheet sleeve 142.

Figure 7:
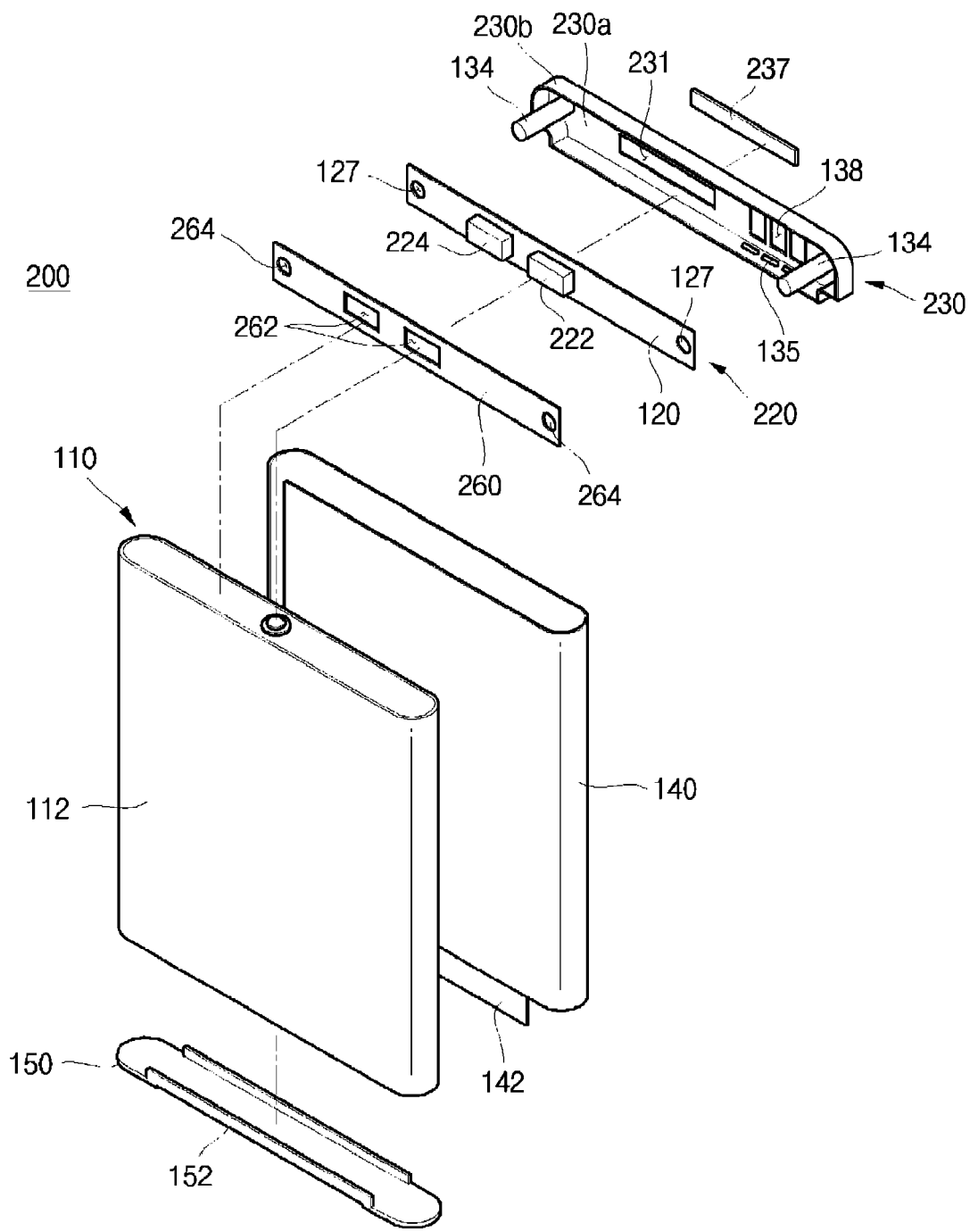
FIG. 7 is an exploded perspective view illustrating a battery pack, according to another exemplary embodiment of the present invention.
Figure 8:
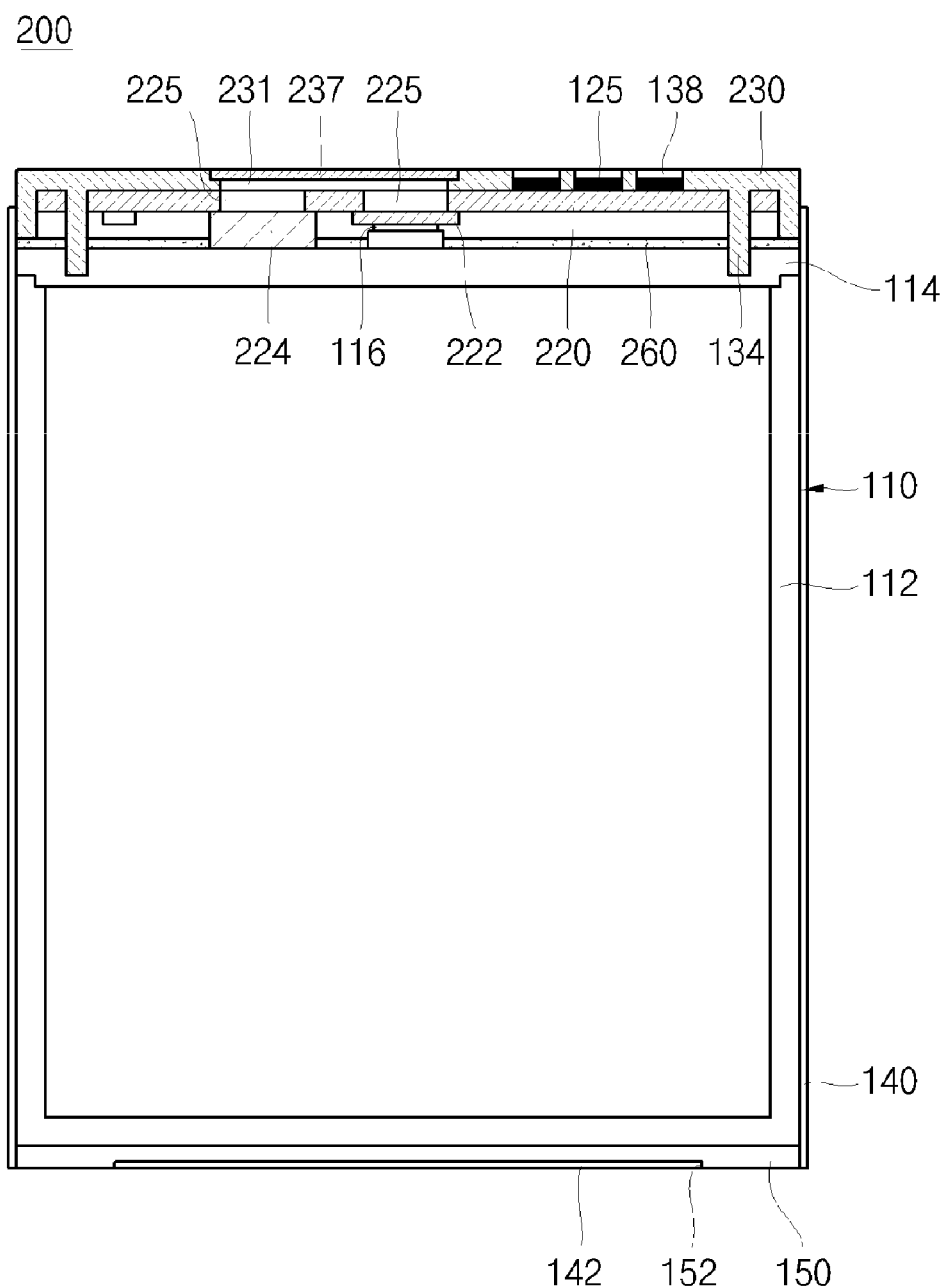
FIG. 8 is a vertical sectional view illustrating the battery pack, according to the embodiment of FIG. 7.
Figure 9:
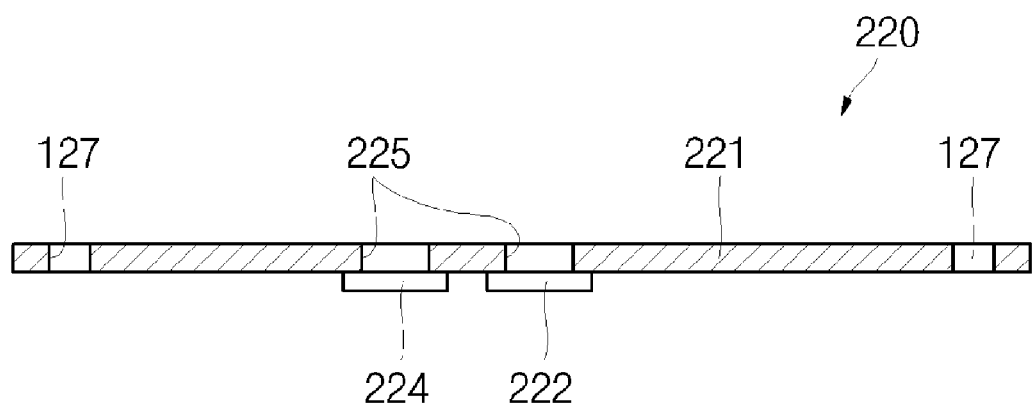
FIG. 9 is a sectional view illustrating a protective circuit board, according to the embodiment of FIG. 7.

FIG. 7 is an exploded perspective view illustrating a battery pack 200, according to another exemplary embodiment of the present invention, and FIG. 8 is a vertical sectional view illustrating the battery pack 200. FIG. 9 is a sectional view illustrating a protective circuit board 220, according to the embodiment of FIG. 7.

Referring to FIGS. 7 to 9, the battery pack 200 includes a bare cell 110, the protective circuit board 220, a case 230, and an insulation member 260. The battery pack 200 may further include an adhesive sheet 140 and a lower cover 150. The battery pack 200 is similar to the battery pack 100, except for the configurations of the protective circuit board 220 and case 230. Therefore, a detailed description of similar elements is omitted.

In the battery pack 200, the height of the protective circuit board 220 is further reduced, by interposing the insulation member 260 between the bare cell 110 and protective circuit board 220. Thus, the capacity of the battery pack 200 can be further increased.

The protective circuit board 220 includes a base plate 221, first and second connection terminals 222 and 224, and first openings 225. The protective circuit board 220 further includes combining openings 127, formed at opposing sides thereof.

The protective circuit board 220 is spaced apart from the bare cell 110. The protective circuit board 220 is coupled to the bare cell 110 by the insulation member 260, which interposed between the protective circuit board 220 and bare cell 110. Thus, the protective circuit board 220 prevents a short between electronic devices (not shown) mounted on the base plate 221, and the cap plate 114. The base plate 221 includes electronic devices (not shown), such as a chip and/or a resistor, which are mounted on a surface of the base plate 221.

The first connection terminal 222 is connected the lower surface of the base plate 221. A lower surface of the first connection terminal 222 contacts the first terminal 116 of the bare cell 110. Accordingly, the first connection terminal 222 is electrically coupled to the first terminal 116. The first connection terminal 222 is connected to the first terminal 116, by welding or a conductive adhesive.

The second connection terminal 224 is connected to the lower surface of the base plate 221. A lower surface of the second connection terminal 224 contacts the cap plate 114 of the bare cell 110. Accordingly, the second connection terminal 224 is electrically coupled to the cap plate 114.

The second connection terminal 224 contacts the cap plate 114, and the first connection terminal 222 contacts the first terminal 116. The first terminal 116 projects from the upper surface of the cap plate 114. The second connection terminal 224 is thicker than the first connection terminal 222. If the second connection terminal 224 has the same thickness as the first connection terminal 222, the protective circuit board 220 may be inclined, with respect to the upper surface of the bare cell 110. On the other hand, the second connection terminal 224 is higher than the electronic device mounted on the lower surface of the protective circuit board 220. If the thickness of the second connection terminal 224 is less than that of the electronic device, the second connection terminal 224 cannot contact the cap plate 114.

The second connection terminal 224 is combined to the cap plate 114, by welding or a conductive adhesive. When the second connection terminal 224 is combined with the cap plate 114, by the conductive adhesive, an adhesive layer may be interposed between the second connection terminal 224 and the cap plate 114.

The first openings 225 are defined in base plate 221. The first openings 125 are formed in regions corresponding to the first and second connection terminals 222 and 224. Accordingly, the first and second connection terminals 222 and 224 are exposed through the base plate 221, through the first opening 225. The first openings 225 are smaller than the first and second connection terminals 222 and 224. The first openings 225 provide a path for a device to weld the first and second connection terminals 222 and 224, to the first terminal 116 and cap plate 114. The first openings 225 provide a path for a device to press the first and second connection terminals 222 and 224, to the first terminal 116 and cap plate 114.

The lower part of the case 230 is open, and the case 230 includes an upper plate 230a and a side wall 230b. In addition, the case 230 includes a second opening 231, combining projections 134, and holding projections 135. The case 230 may further include a cover 237. The case 230 may further include a terminal hole 138. The case 230 is similar to the case 130, except that the case 230 does not include the first pressing part 132 and the second pressing part 133

The second opening 231 is in a region of the upper plate 230a corresponding to the first openings 225 of the protective circuit board 220. The second opening 231 corresponds to the first openings 225. The second opening 231 may face the first openings 225. The second opening 231 exposes the first and second connection terminals 222 and 224, to the upper part of the case 230.

The cover 237 corresponds to the shape of the second opening 231. The cover 237 is combined to the upper part of the second opening 231, to seal the second opening 231. The cover 237 is adhered to the second opening 231, by an adhesive.

The insulation member 260 is made of insulating material. The insulation member 260 can be a double-sided tape that has an adhesive on both sides thereof. The insulation member 260 corresponds to the shape of the case 230. The insulation member 260 includes first and second through-holes 262 and 264.

The insulation member 260 is interposed between the bare cell 110 and the protective circuit board 220, to electrically insulate the cap plate 114 from the protective circuit board 220. In addition, when the insulation member 260 is formed of the double-sided tape, the case 230 can be more strongly fixed to the bare cell 110.

The first through-holes 262 are defined in opposing sides of the insulation member 260. The first through-holes 262 correspond to the first and second connection terminals 222 and 224. Accordingly, the first and second connection terminals 222 and 224 respectively contact the first terminal 116 and cap plate 114, through the first through-holes 262. On the other hand, the first through-holes 262 may be formed as a single hole that corresponds to the first and second connection terminals 222 and 224.

The second through-holes 264 are formed at opposing sides of the insulation member 260. The second through-holes 264 correspond to the combining openings 127 of the protective circuit board 220. The second through-hole 264 are formed to have a diameter that is larger than that of the combining projections 134. Thus, the combining projections 134 are combined to the combining groove 115 of the cap plate 114, through the combining openings 127 and the second through-holes 264.

As described above, the battery pack, according to aspects of the present invention, produces the following effects. First, the height of a bare cell is increased relative to the length of the battery pack, thereby improving the battery capacity. Second, the connection structure of the bare cell and protective circuit board is simplified, thereby improving productivity and manufacturing costs. Third, the battery capacity can be increased, in the same battery pack, by interposing the insulation member between the bare cell and the protective circuit board.

According to aspects of the present invention, various elements, such at the combining openings, the combining grooves, and the terminal grooves, are described as plural. However, the present invention also encompasses these elements when present singularly. In addition, elements referred to as being horizontal, or vertical, are described as such for convenience, and can have different orientations, depending on the orientation of the battery pack.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. A battery pack, comprising:
   a bare cell comprising,
      an electrode assembly;
      a can to house the electrode assembly, comprising opposing main walls, opposing side walls, a lower plate, and a cap plate facing the lower plate, the cap plate comprising a first terminal that extends away from the bare cell; and
   a protective circuit board disposed on the cap plate, the protective circuit board comprising:
      a base plate,
      a first connection terminal connected to the first terminal,
      a second connection terminal connected to the cap plate, and
      a single first opening formed in the base plate and aligned with both the first and second connection terminals, wherein both the first and second connection terminals respectively extend from a perimeter of the first opening.

2. The battery pack of claim 1, further comprising a case to house the protective circuit board, connected to the bare cell, the case comprising:
an upper plate;
a side wall; and
a second opening facing the first opening.

3. The battery pack of claim 1, wherein the first and second connection terminals are L-shaped, extend away from the case, and extend toward one another across the first opening.

4. The battery pack of claim 1, wherein:
the first connection terminal comprises a first vertical plate that extends away from the base plate, and a first horizontal plate that extends generally perpendicularly from the first vertical plate; and
the second connection terminal comprises a second vertical plate that extends away from the base plate, and a second horizontal plate that extends generally perpendicularly from the second vertical plate.

5. The battery pack of claim 4, wherein the first vertical plate is shorter than the second vertical pate.

6. The battery pack of claim 2, wherein:
the cap plate comprises combining grooves formed at opposing sides thereof; the protective circuit board comprises combining openings that face the combining grooves; the case further comprises combining projections that pass through the combining openings, and into the combining grooves.

7. The battery pack of claim 2, wherein the case further comprises holding projections formed on an inner surface of the side wall, to secure the protective circuit board against the upper plate.

8. The battery pack of claim 7, wherein the holding projections are angled with respect to the inner surface of the side wall, such that the heights of the holding projections decrease, as a distance from the upper plate increases.

9. The battery pack of claim 2, wherein the case further comprises:
a first pressing part that extends from the upper plate, so as to contact the first connection terminal; and
a second pressing part that extends from the upper plate, so as to contact the second connection terminal.

10. The battery pack of claim 9, wherein the first and second pressing parts are formed around opposing sides of the second opening.

11. The battery pack of claim 9, wherein the first pressing part extends a shorter distance from the upper plate than the second pressing part.

12. The battery pack of claim 9, wherein the case further comprises a support part disposed between the first and second pressing parts.

13. The battery pack of claim 12, wherein the case further comprises a cover to seal the second opening.

14. The battery pack of claim 13, wherein: the support part comprises a connection hole; and the cover comprises a connection pin that is disposed in the connection hole.

15. The battery pack of claim 2, further comprising: a lower cover disposed on the lower plate; and an adhesive sheet disposed on the main and side walls of the bare cell, the side wall of the case.

16. The battery pack of claim 15, wherein: the lower cover comprises a groove; and the adhesive sheet comprises a sheet sleeve that extends between the main walls, across the groove.

17. The battery pack of claim 16, wherein the depth of the sheet groove corresponds to the thickness of the sheet sleeve.

* * * * *

UNITED STATES PATENT AND TRADEMARK OFFICE
CERTIFICATE OF CORRECTION

PATENT NO. : 8,232,001 B2  
APPLICATION NO. : 12/250825  
DATED : July 31, 2012  
INVENTOR(S) : Bohyun Byun Page 1 of 1

It is certified that error appears in the above-identified patent and that said Letters Patent is hereby corrected as shown below:

At Column 9, line 49, after "133" insert --.--.

At Column 10, line 36, please delete "at" and insert --as--.

At Column 11, line 23, Claim 5, change "pate" to --plate--.

Signed and Sealed this
Twelfth Day of March, 2013

Teresa Stanek Rea
*Acting Director of the United States Patent and Trademark Office*